United States Patent Office 3,576,026
Patented Apr. 20, 1971

3,576,026
TRIPTYCH-SILAZAZOLIDINES
Gary E. Le Grow, Midland, Mich., assignor to Dow Corning Corporation, Midland, Mich.
No Drawing. Filed Oct. 3, 1969, Ser. No. 863,685
Int. Cl. C07f 7/10
U.S. Cl. 260—448.2
6 Claims

ABSTRACT OF THE DISCLOSURE

Compounds of the formula

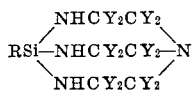

are prepared by reacting a trisdialkylaminosilane with a tris(beta-aminoethyl)amine. The products are useful as curing catalysts for epoxy resins. Specific example is the reaction of methyl trisdimethylaminosilane with tris(beta-aminoethyl)amine at 100° to give the compound

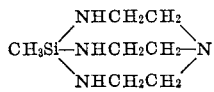

---

This invention relates to compounds of the formula

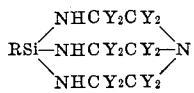

in which R is hydrogen, monovalent hydrocarbon, monovalent halohydrocarbon or $R'_2N$ in which R' is lower alkyl or aryl hydrocarbon radical and Y is hydrogen or lower alkyl.

These compounds are made by reacting tris-dialkylaminosilanes of the formula $RSi(NR'_2)_3$ with

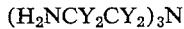

$$(H_2NCY_2CY_2)_3N$$

to give

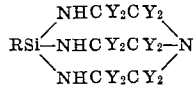

and $R'_2NH$. The reaction is carried out by merely heating a mixture of the two reactants at a temperature above the boiling point of the dialkylamine by-product. Otherwise, the temperature of the reaction is not critical and no solvents are needed although solvents can be employed, if desired.

For the purpose of this invention, R can be any monovalent hydrocarbon radical or halohydrocarbon radical.

R can be any monovalent hydrocarbon radical such as alkyl radicals such as methyl, ethyl, isopropyl, hexyl, octadecyl or myricyl; alkenyl radicals such as vinyl, allyl, hexenyl; alkynyl radicals such as propargyl; cycloaliphatic radicals such as cyclopentyl, cyclohexyl or cyclohexenyl; aromatic hydrocarbon radicals such as phenyl, tolyl, xylyl, xenyl, naphthyl or anthracyl and aralkyl hydrocarbon radicals such as benzyl, beta-phenylethyl, beta-phenylpropyl or gamma-tolylpropyl.

R can be any monovalent halogenated hydrocarbon group such as aliphatic groups such as chloromethyl, 3-chloropropyl, 3,3,3,-trichloropropyl, perfluorovinyl, chlorooctadecyl or radicals of the formula $R_fCH_2CH_2$— where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha, alpha,alpha-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)-ethyl or beta-(bromophenyl)propyl.

For the purpose of this invention R' can be any lower alkyl radical such as methyl, ethyl, isopropyl, butyl, or octyl; or any aryl hydrocarbon radical such as phenyl, tolyl or xenyl; and Y can be hydrogen or any lower alkyl radical such as methyl, ethyl, isopropyl, butyl or octyl.

The compositions of this invention are useful as catalysts for curing epoxy resins. This can be done by mixing the catalyst with the epoxy resin and heating to a temperature above that required to activate the catalyst. In general, curing occurs at temperatures of 100 to 200° C.

The following examples are illustrative only and should not be construed as limiting the invention which is properly delineated in the appended claims.

EXAMPLE 1

A mixture of 32 g. of tris-dimethylaminosilane and 29.2 g. of tris-(beta-aminoethyl)amine was heated at 100° C. for one hour. During this time the heterogenous mixture became homogenous and dimethylamine was evolved. The reaction mixture was cooled and vacuum distilled to give 5-hydrogen-triptych-silazazolidine; melting point of 50 to 55° C. and B.P. 110° C. at 0.02 mm. The structure of this compound was identified by its nuclear magnetic resonance spectrum.

EXAMPLE 2

Gaseous dimethylamine was passed into a stirred solution of 161.5 g. of vinyltrichlorosilane in one liter of hexane. An exothermic reaction occurred with the formation of dimethylamine hydrochloride. The product was filtered and the solvent removed to give tris-dimethylaminovinylsilane.

94 g. of tris-dimethylaminovinylsilane and 73.3 g. of tris(beta-aminoethyl)amine were mixed and heated with the liberation of dimethylamine in the formation of a homogenous solution. The solution was further heated at 100 ° C. for one hour, then cooled and vacuum distilled to give 5-vinyltriptyschsilazazolidine, boiling 110° C. at 0.05 mm. and having a melting point of 42 to 44° C.

The structure of the compound was elucidated by nuclear magnetic resonance data.

EXAMPLE 3

An excess of dimethylamine was added to a solution of 150 g. of methyltrichlorosilane in 2 liters of hexane. The resulting dimethylamine hydrochloride was removed by filtration and the solvent was distilled to give tris-dimethylaminomethylsilane.

48 g. of tris-dimethyaminomethylsilane was mixed with 37 g. of tris(beta-aminoethyl)amine and heated at 100° C. to give a homogenous solution with the evolution of dimethylamine. Heating was continued until evolution of dimethylamine ceased and the liquid was distilled to give 5 methyltriptych-silazazolidine boiling 115 ° C. at 0.1 mm. and melting at 50 to 54° C.

EXAMPLE 4

Dimethylamine was reacted with 211.5 g. of phenyltrichlorosilane in one liter of dry hexane. The dimethylamine hydrochloride was removed and the product was distilled to give tris-dimethylaminophenylsilane.

48.5 g. of tris-dimethylaminophenylsilane was mixed with 29.2 g. of tris(beta-aminoethyl)amine and heated to 100° C. to give a homogeneous liquid with the elimination of dimethylamine. The product was distilled to give 5-phenyl-triptych-silazazolidine, boiling 149° C. at 0.05 mm., melting 90 to 93° C.

EXAMPLE 5

The following triptych-silazazolidines are obtained when the following trisaminosilanes are reacted with the following tris(betaaminoethyl)amines. In the table Me is used for the methyl radical and Et for the ethyl radical.

| Tris-aminosilane | Tris(beta-aminoethyl) amine | Triptych-silazazolidines |
|---|---|---|
| $CF_3CH_2CH_2Si(NMe_2)_3$ | $(NH_2CH_2CH_2)_3N$ | $CF_3CH_2CH_2Si(-NHCH_2CH_2-)_3N$ |
| $C_{18}H_{37}Si(NMe_2)_3$ | $(NH_2CH_2CH_2)_3N$ | $C_{18}H_{37}Si(-NHCH_2CH_2-)_3N$ |
| $C_6H_{11}Si(NMe_2)_3$ | $(NH_2CH_2CH_2)_3N$ | $C_6H_{11}Si(-NHCH_2CH_2-)_3N$ |
| $CH_3C_6H_4Si(NMe_2)_3$ | $(NH_2CH_2CH_2)_3N$ | $CH_3C_6H_4Si(-NHCH_2CH_2-)_3N$ |
| $C_6H_5CH(CH_3)CH_2Si(NMe_2)_3$ | $(NH_2CH_2CH_2)_3N$ | $C_6H_5CH(CH_3)CH_2Si(-NHCH_2CH_2-)_3N$ |
| $Cl_3C_6H_2Si(NMe_2)_3$ | $(NH_2CH_2CH_2)_3N$ | $Cl_3C_6H_2Si(-NHCH_2CH_2-)_3N$ |
| $Cl(CH_2)_3Si(NMe_2)_3$ | $(NH_2CH_2CH_2)_3N$ | $Cl(CH_2)_3Si(-NHCH_2CH_2-)_3N$ |
| $C_6H_4Si(NMe_2)_3$ | $(NH_2CH_2CH_2)_3N$ | $BrC_6H_4Si(-NHCH_2CH_2-)_3N$ |
| $H_3S(NEt_2)_3$ | $(NH_2CMeHCMeH)_3N$ | $CH_3Si(-NHCH(Me)CH(Me)-)_3N$ |
| $H_2Si[N(C_3H_5)_2]_3$ | $(NH_2CH_2CH_2)_3N$ | $CH_3Si(-NHCH_2CH_2-)_3N$ |

EXAMPLE 6

When tetrakis-dimethylaminosilane is reacted with tris(beta-aminoethyl)amine in accordance with the procedure of Example 1, 5(dimethylamino)triptysch-silazazolidine is obtained.

That which is claimed is:
1. A compound of the formula

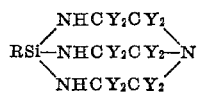

in which R is hydrogen, a monovalent hydrocarbon radical, a monovalent halohydrocarbon radical, or $R'_2N$ in which R' is a lower alkyl or aryl hydrocarbon radical, and
Y is hydrogen or a lower alkyl radical.

2. The compound of claim 1 in which R is hydrogen and each Y is hydrogen.
3. The compound of claim 1 in which R is methyl and each Y is hydrogen.
4. The compound of claim 1 in which R is vinyl and each Y is hydrogen.
5. The compound of claim 1 in which R is phenyl and each Y is hydrogen.
6. The compound of claim 1 in which R is 3,3,3-trifluoropropyl and each Y is hydrogen.

References Cited

UNITED STATES PATENTS

| | | | |
|---|---|---|---|
| 3,032,576 | 5/1962 | Morehouse | 260—448.2N |
| 3,118,921 | 1/1964 | Samour | 260—448.8R |
| 3,310,578 | 3/1967 | Bluestein | 260—448.8R |

TOBIAS E. LEVOW, Primary Examiner

P. F. SHAVER, Assistant Examiner

U.S. Cl. X.R.

260—830, 46.5, 448.2N, 448.2H, 448.8R, 448.2U